(12) United States Patent
Kim et al.

(10) Patent No.: US 8,774,968 B2
(45) Date of Patent: Jul. 8, 2014

(54) TRAJECTORY PLANNING METHOD, TRAJECTORY PLANNING SYSTEM AND ROBOT

(75) Inventors: Chyon Hae Kim, Wako (JP); Hiroshi Tsujino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 709 days.

(21) Appl. No.: 13/004,517

(22) Filed: Jan. 11, 2011

(65) Prior Publication Data

US 2011/0172818 A1     Jul. 14, 2011

(30) Foreign Application Priority Data

Jan. 12, 2010  (JP) .................................. 2010-003988
Dec. 8, 2010   (JP) .................................. 2010-274005

(51) Int. Cl.
*G05B 19/04*     (2006.01)

(52) U.S. Cl.
USPC ............................ 700/246; 700/245; 700/262

(58) Field of Classification Search
CPC ................... B25J 9/1666; G05B 2219/40446; G05B 2219/40496
USPC ........................ 700/245, 246, 261, 262; 901/2
See application file for complete search history.

(56) References Cited

U.S. PATENT DOCUMENTS 6,137,493 A * 10/2000 Kamimura et al. ........... 345/423
6,493,607 B1 * 12/2002 Bourne et al. ................ 700/255

(Continued)

FOREIGN PATENT DOCUMENTS

| JP | 2002-091565 A | 3/2002 |
| JP | 2009-131940 A | 6/2009 |
| JP | 2009-211571 A | 9/2009 |

OTHER PUBLICATIONS

Pedro S. Huang, "Planning for Dynamic Motions Using a Search Tree," a graduate thesis of Toronto University Graduate Department of Computer Science, University of Toronto, 1996, pp. 1-67.*

(Continued)

*Primary Examiner* — Khoi Tran
*Assistant Examiner* — Jorge Peche
(74) *Attorney, Agent, or Firm* — Squire Patton Boggs (US) LLP

(57) ABSTRACT

A trajectory planning system obtains a trajectory for controlling a state of an object toward a goal state. The system includes a search tree generating section which registers a state of the object as a root of a search tree in a state space, registers a next state of the object after a lapse of a predetermined time interval obtained through dynamical relationships during the time interval as a branch of the search tree in the state space. The system further includes a known-state registration tree storing section which stores a known-state registration tree and a known-state registration tree generating section which determines a cell to which the next state belongs among a plurality of cells previously prepared by segmenting the state space, determines whether or not a state which belongs to the cell has already been registered as a branch of the known-state registration tree, discards the next state when a state which belongs to the cell has been registered, and registers the next step as a branch of the known-state registration tree when a state which belongs to the cell has not been registered. The system further includes a trajectory generating section which selects a state whose distance to the goal state is minimum among states registered as branches of the known-state registration tree and obtains a trajectory using a sequence of states in a backward direction from the state toward the root of the known-state registration tree.

16 Claims, 24 Drawing Sheets

(56) References Cited

U.S. PATENT DOCUMENTS

| | | | |
|---|---|---|---|
| 6,697,707 B2* | 2/2004 | Peters, II | 700/245 |
| 7,328,196 B2* | 2/2008 | Peters, II | 706/14 |
| 8,116,908 B2* | 2/2012 | Ng-Thow-Hing et al. | 700/245 |
| 8,458,715 B1* | 6/2013 | Khosla et al. | 718/104 |
| 2005/0149227 A1* | 7/2005 | Peters, II | 700/245 |
| 2008/0250875 A1* | 10/2008 | Khosla et al. | 73/863 |
| 2011/0231016 A1* | 9/2011 | Goulding | 700/246 |

OTHER PUBLICATIONS

"Planning for Dynamic Motions Using a Search Tree," Pedro S. Huang, a graduate thesis of Toronto University, Graduate Department of Computer Science, University of Toronto, 1996, pp. 1-96.

* cited by examiner

TRAJECTORY PLANNING METHOD, TRAJECTORY PLANNING SYSTEM AND ROBOT

BACKGROUND OF THE INVENTION

1. Field of the Invention

The present invention relates to a trajectory planning method and a trajectory planning system in which a sequence of states of an object up to the goal state is generated and a robot provided with the trajectory planning system.

2. Background Art

For example, assume that a goal state of arms of a robot is realized by controlling torques around joints of the arms based on a trajectory planning. When positions and angles alone of the arms are handled in the trajectory planning, torques around the joints cannot be controlled. In order to control torques around the joints, a trajectory planning of a state space (phase space) which includes angles and angular velocities of the arms has to be generated.

In methods for generating a trajectory planning in a state space, there is a method in which state transition in the state space is described as a tree. In this method, a predetermined number of branches are derived from the root or a branch and all of the branches are searched. However, when the number of derived branches is N and a depth of the tree is M, the number of branches to be searched at a level with a depth of the tree of M will be $N^M$. Accordingly, calculation cost will be enormous.

With this being the situation, a methods in which an evaluation function of branches of a search tree is determined and branches are derived from branches selected using the evaluation function is proposed (Perdo S. Huang: "Planning for Dynamic Motions Using a Search Tree", a graduate thesis of Toronto Univ., (1996)). According to this method, calculation cost can be reduced. However, an evaluation function has to be empirically determined by the designer. When some evaluation functions are used, sufficient search in the state space cannot be carried out. In other words, there will be a restriction in search in the state space with this method.

Accordingly, there is a need for a trajectory planning method and a trajectory planning system which put no constraint on search in the state space and in which calculation cost cabe reduced.

SUMMARY OF THE INVENTION

A trajectory planning method according to an aspect of the invention is a method for obtaining a trajectory for controlling a state of an object toward a goal state by a trajectory planning system. The method includes the steps of registering, by a search tree generating section of the trajectory planning system, a state of the object as a root of a search tree in a state space and registering, by the search tree generating section, a next state of the object after a lapse of a predetermined time interval obtained through dynamical relationships during the time interval as a branch of the search tree in the state space. The present method further includes the steps of determining, by a known-state registration tree generating section, a cell to which the next state belongs among a plurality of cells which have been previously prepared by segmenting the state space, determining, by the known-state registration tree generating section, whether or not a state which belongs to the cell has already been registered as a branch of a known-state registration tree, discarding the next state when a state which belongs to the cell has been registered, and registering the next step as a branch of the known-state registration tree in a known-state registration tree storing section when a state which belongs to the cell has not been registered. The present method further includes selecting, by a trajectory generating section of the trajectory planning system, a state whose distance to the goal state is minimum among states registered as branches of the known-state registration tree and obtaining, by the trajectory generating section, a trajectory using a sequence of states in a backward direction from the state toward the root of the known-state registration tree.

According to the method of the present aspect, the known-state registration tree generating section puts together branches of the search tree into a branch of the known-state registration tree, and therefore calculation cost can be remarkably reduced. Thus, according to the method of the present aspect, a trajectory planning system which is free from constraints on search in the state space and whose calculation cost is reduced can be obtained.

According to an embodiment of the present invention, motion of the object is restricted by determining an area of the state space to which a state is allowed to belong.

According to the present embodiment, for example, the object can be made to move around an obstacle by excluding an area which is occupied by the obstacle from an area of the state space to which a state is allowed to belong According to an embodiment of the present invention, motion of the object is restricted by providing constraints concerning the dynamical relationships during the predetermined time interval.

According to the present embodiment, for example, a planned motion of the object can be made feasible by determining upper limits of imposed torques.

According to an embodiment of the present invention, the search tree generating section derives a branch corresponding to a next state from all branches at lowest level of the search tree when obtaining a next state of the object in the state space as a branch of the search tree.

According to the present embodiment, a branch is derived from all branches at lowest level of the search tree, and a complete search can be carried out for all branches thus derived. As a result, the state space can be searched uniformly.

According to an embodiment of the present invention, the search tree generating section derives a branch corresponding to a next state from selected branches of the search tree when obtaining a next state of the object in the state space as a branch of the search tree.

According to the present embodiment, calculation cost can be remarkably reduced when a selective search is carried out using an evaluation function or the like.

According to an embodiment of the present invention, the known-state registration tree generating section does not discard the next state and registers the next state as a branch of the known-state registration tree in the known-state registration tree storing section even if a state which belongs to the cell has already been registered as a branch of the known-state registration tree when the cell to which the next state belongs includes the goal state.

According to the present embodiment, a final state which is closer to the gal state can be obtained.

According to an embodiment of the present invention, after the known-state registration tree generating section has registered the next state as a state which belongs to the cell when a state belongs to the cell has not been registered, the known-state registration tree generating section obtains a distance between the next state and the goal state in the state space and registers the next state as a final best state if the distance is less than a minimum distance among distances between states which have been already registered as branches of the known-state registration tree and the goal state, and the trajectory generating section selects the final best state as the state whose distance to the goal state is minimum.

According to the present embodiment, the state whose distance to the goal state is minimum can be efficiently selected from states which have been already registered as branches of the known-state registration tree in the known-state registration tree storing section to obtain a trajectory.

According to an embodiment of the present invention, the object includes one or more members each end portion of which except for the tip is connected with a joint.

According to the present embodiment, a trajectory planning of one or more members each end portion of which except for the tip is connected with a joint can be carried out at a low calculation cost and without constraints on search.

According to an embodiment of the present invention, the object includes members of a robot.

According to the present embodiment, a trajectory planning of the members of the robot can be carried out at a low calculation cost and without constraints on search.

According to an embodiment of the present invention, the state space is a phase space.

According to the present embodiment, a trajectory planning can be efficiently obtained using the phase space.

A trajectory planning system according to an aspect of the present invention obtains a trajectory for controlling a state of an object toward a goal state. The present system includes a search tree generating section which registers a state of the object as a root of a search tree in a state space, registers a next state of the object after a lapse of a predetermined time interval obtained through dynamical relationships during the time interval as a branch of the search tree in the state space. The present system further includes a known-state registration tree storing section which stores a known-state registration tree and a known-state registration tree generating section which determines a cell to which the next state belongs among a plurality of cells which have been previously prepared by segmenting the state space, determines whether or not a state which belongs to the cell has already been registered as a branch of the known-state registration tree, discards the next state when a state which belongs to the cell has been registered, and registers the next step as a branch of the known-state registration tree in the known-state registration tree storing section when a state which belongs to the cell has not been registered. The present system further includes a trajectory generating section which selects a state whose distance to the goal state is minimum among states registered as branches of the known-state registration tree and obtains a trajectory using a sequence of states in a backward direction from the state toward the root of the known-state registration tree.

According to the system of the present aspect, the known-state registration tree generating section puts together branches of the search tree into a branch of the known-state registration tree, and therefore calculation cost can be remarkably reduced. Thus, according to the system of the present aspect, a trajectory planning system which is free from constraints on search in the state space and whose calculation cost is reduced can be obtained.

According to an embodiment of the present invention, motion of the object is restricted by determining a range of the state space to which a state is allowed to belong.

According to the present embodiment, for example, the object can be made to move around an obstacle by excluding an area which is occupied by the obstacle from an area of the state space to which a state is allowed to belong According to an embodiment of the present invention, motion of the object is restricted by providing constraints concerning the dynamical relationships during the predetermined time interval.

According to the present embodiment, for example, a planned motion of the object can be made feasible by determining upper limits of imposed torques.

According to an embodiment of the present invention, the state space is a phase space.

According to the present embodiment, a trajectory planning can be efficiently obtained using the phase space.

A trajectory planning and controlling system according to an aspect of the present invention includes the trajectory planning system described above and a trajectory controlling section which realizes a trajectory planned by the trajectory planning system through feedback control.

In the trajectory planning and controlling system according to the present aspect, a trajectory planned by the trajectory planning system can be realized through feedback control in real time.

A robot according to an aspect of the present invention includes the trajectory planning and controlling system according to the present invention and the object includes members of the robot and the members of the robot are controlled according to the trajectory.

In the robot according to the present aspect, a trajectory planning of the members of the robot can be obtained at low calculation cost and without constraints on search. Further, a planned trajectory can be realized in real time through feedback control.

DETAILED DESCRIPTION

Figure 1:
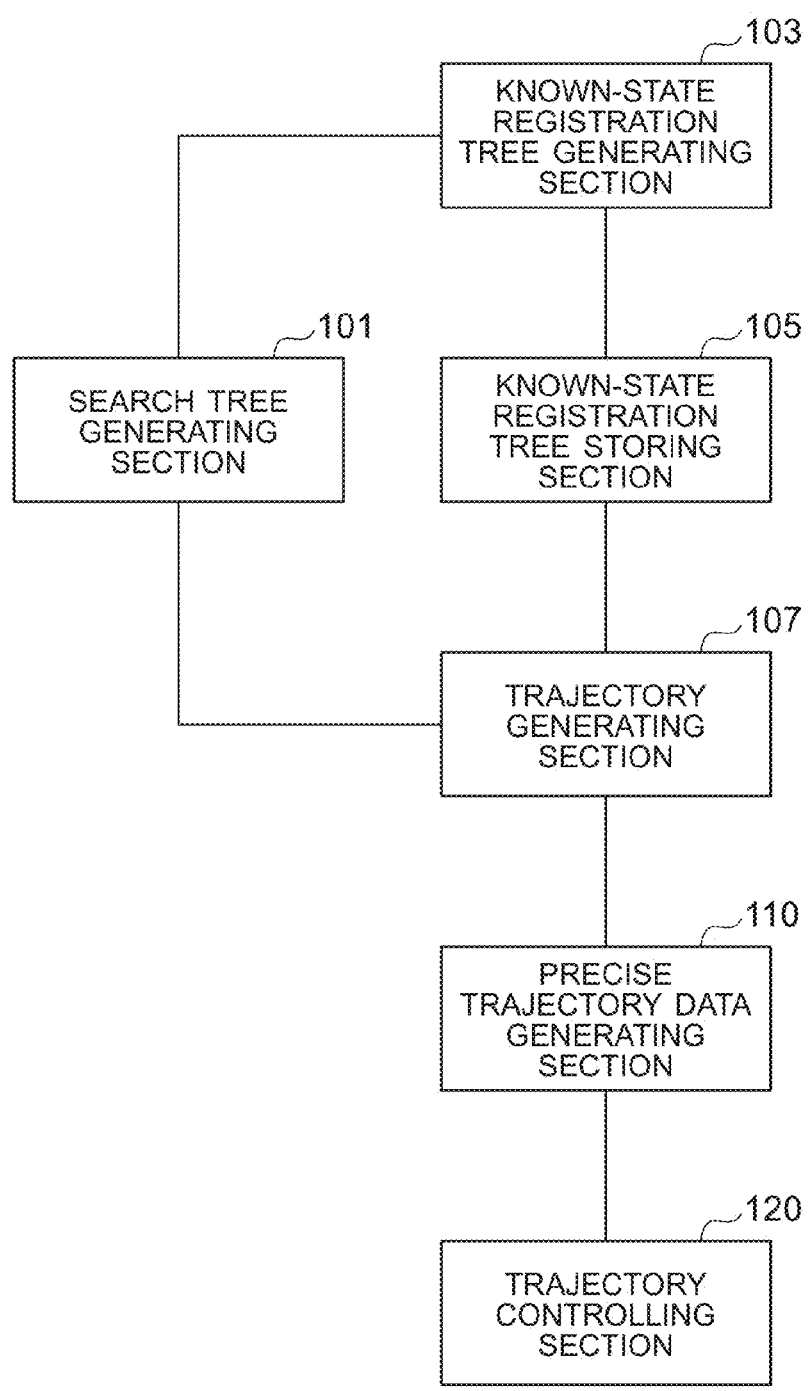
FIG. 1 shows a configuration of a trajectory planning and controlling system according to an embodiment of the present invention.

FIG. 1 shows a configuration of a trajectory planning and controlling system 100 according to an embodiment of the present invention. The trajectory planning system 100 is a system used to obtain a trajectory in a state space which leads to a goal state of such an object as an arm of a robot. The trajectory planning system 100 is provided with a search tree generating section 101 for generating a search tree having branches which correspond to positions of the object in the state space, a known-state registration tree generating section 103 for generating a known-state registration tree which has branches selected from the branches of the search tree under predetermined conditions, a known-state registration tree storing section 105 for storing known-state registration trees, a trajectory generating section 107 for generating a trajectory in the state space of the object, a precise trajectory data generating section 110 for generating precise trajectory data and a trajectory controlling section 120 for controlling a trajectory based on the precise trajectory data. Function of each component will be described in detail below.

Figure 2:
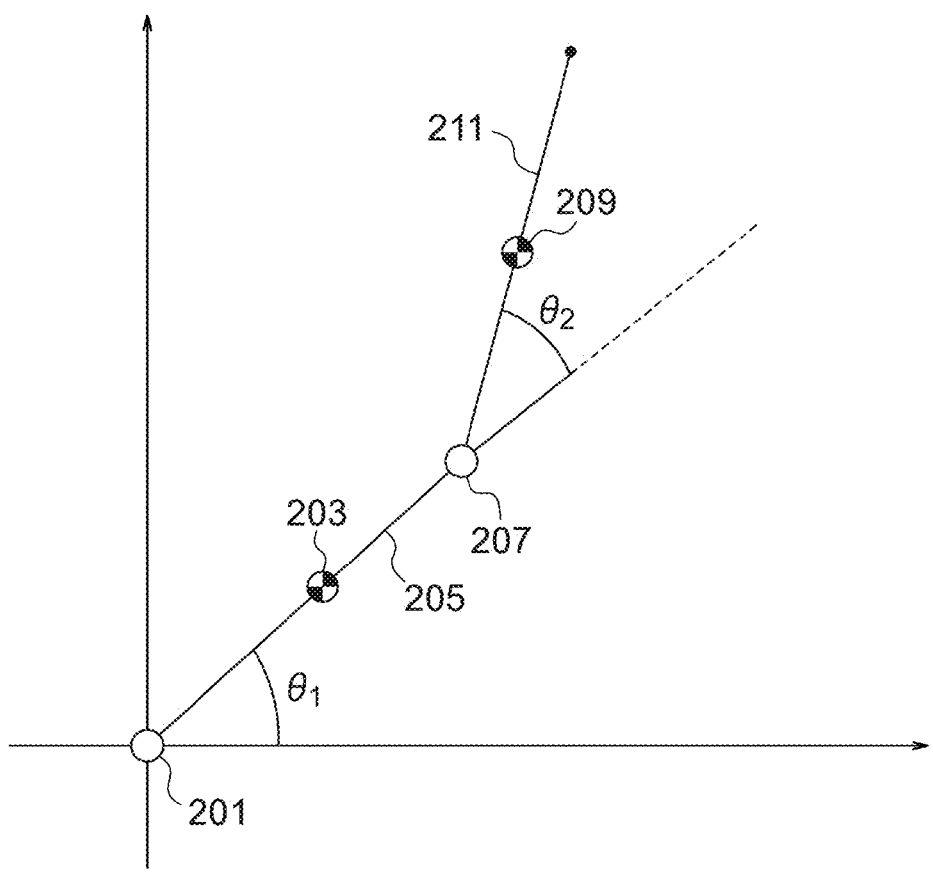
FIG. 2 shows a configuration of double inverted pendulums.

FIG. 2 shows a configuration of double inverted pendulums 200. In embodiments described below, the object is represented as double inverted pendulums 200 which move in a two-dimensional surface. The double inverted pendulum 200 includes a first link 205, a second link 211, a first joint 201 which rotatably connects the first link 205 to a fixed point and a second joint 207 which rotatably connects the second link 211 to the first link 205.

Motion of the double inverted pendulums 200 is determined by torques imposed on the first joint 205 and the second joint 207 and is represented by an angle of the first link 205 with respect to x axis $\theta_1$, an angle of the second link 211 with respect the first link 205 $\theta_2$ and angular velocities of them $\dot{\theta}_1$ and $\dot{\theta}_2$. Under the circumstances, a phase space as described below is adopted as the state space.

$(\theta_1, \theta_2, \dot{\theta}_1, \dot{\theta}_2)$

Figure 3:
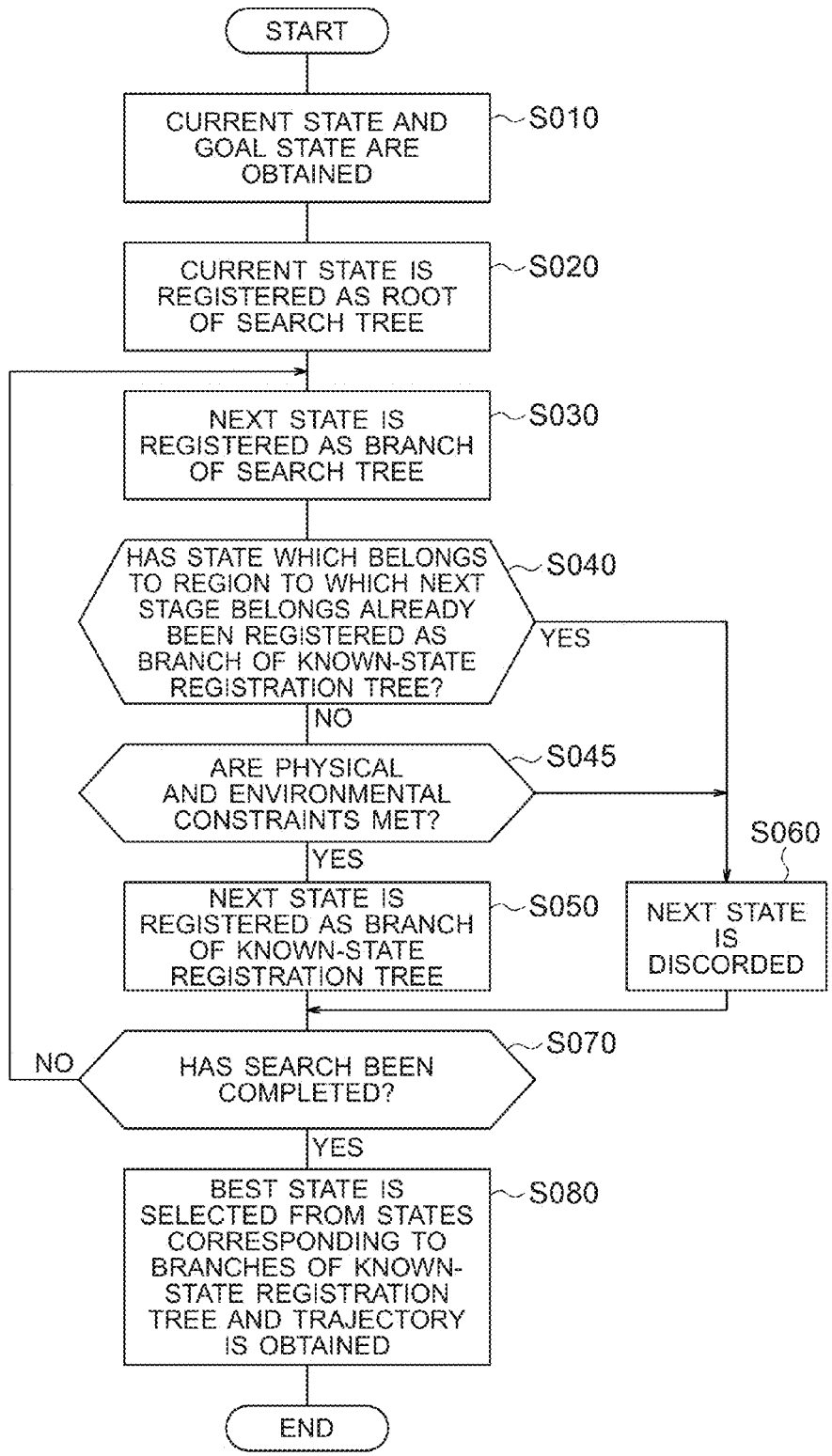
FIG. 3 is a flowchart for illustrating a trajectory planning method according to the present embodiment.

FIG. 3 is a flowchart for illustrating a trajectory planning method according to the present embodiment.

In step S010 of FIG. 3, the search tree generating section 101 obtains a current state and a goal state of the double inverted pendulums 200. A state means a position in the phase space.

In step S020 of FIG. 3, the search tree generating section 101 registers a position of the current state as a root of the search tree.

In step S030 of FIG. 3, the search tree generating section 101 registers a position of the next state after a predetermined time interval as a branch of the search tree. The position of the next state after a predetermined time interval is determined by equations of motion or a dynamics simulator. As described above, motion of the double inverted pendulums 200 is determined by torques imposed on the first joint 205 and the second joint 207. Accordingly, if torques to be imposed on the first joint 205 and the second joint 207 during a predetermined time interval are determined, the next state of the double inverted pendulums 200 after a predetermined time interval is determined. Torques to be imposed on the first joint 205 and the second joint 207 during the predetermined time interval may be changed in increments of a predetermined amount between the minimum value and the maximum value and then states corresponding to respective cases may be determined. In this case, a complete search can be carried out by breadth first search while torques to be imposed on the first joint 205 and the second joint 207 during the predetermined time interval are changed in increments of the predetermined amount between the minimum value and the maximum value.

Figure 4:
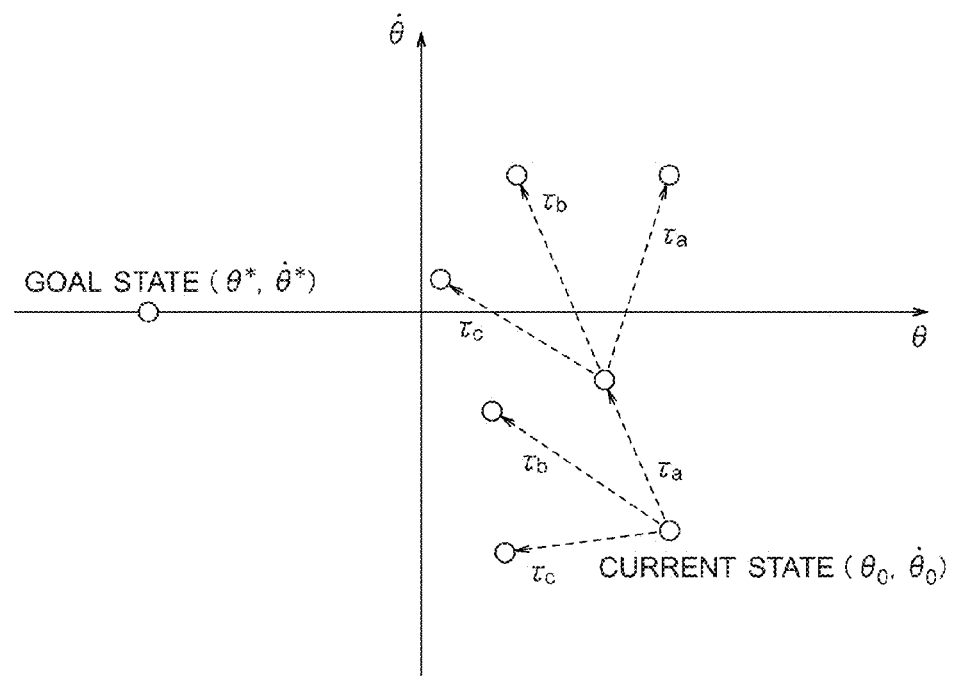
FIG. 4 illustrates steps S020 and S030 of FIG. 3.

FIG. 4 illustrates steps S020 and S030 of FIG. 3. In FIG. 4, the phase space is represented as a two-dimensional space for the sake of simplicity. Three different next states are determined by imposing three different torques $\tau_a$, $\tau_b$, $\tau_c$ on the double inverted pendulums 200 in the current state during the predetermined time interval. The search tree generating section 101 regards these states as branches of the search tree. Further, when three different torques $\tau_a$, $\tau_b$, $\tau_c$ are imposed on the double inverted pendulums 200 in each state represented by a generated branch, further three different next states are determined.

In step S040 of FIG. 3, the known-state registration tree generating section 103 generates a known-state registration tree which has branches selected from the branches of the search tree under predetermined conditions. In order to generate a known-state registration tree, the phase space is previously segmented.

Figure 5:
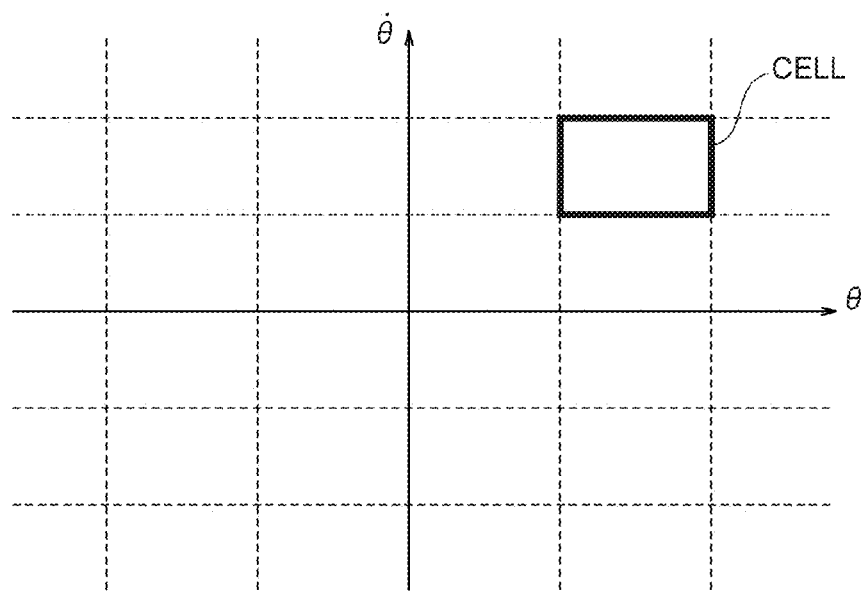
FIG. 5 shows a segmented phase space.

FIG. 5 shows a segmented phase space. An estimated range of angle and that of angular velocity may be divided into equal parts. A segment of the phase space thus segmented will be referred to as a cell herein after.

Assume that the number of branches derived from the root or a branch as described above is N and a depth of the tree is M when the search tree generating section 101 generates the search tree. Then the number of branches to be searched at a level of a depth of tree of M is $N^M$. The known-state registration tree generating section 103 puts together branches derived by the search tree generating section 101 using cells described above. More specifically, the known-state registration tree generating section 103 carries out the following operation in step S040 of FIG. 3.

The known-state registration tree generating section 103 determines to which cell in the phase space, each of the next states represented by branches which have been derived by the search tree generating section 101. Then, the known-state registration tree generating section 103 determines whether or not a state which belongs to the cell has already been registered as a branch of the known-state registration tree. If a state has not been registered, the process goes to step S045. If a state has already been registered, the process goes to step S060.

In step S045 of FIG. 3, the known-state registration tree generating section 103 determines whether or not the next state represented by a branch which has been derived by the search tree generating section 101 meets physical constraints and environmental constraints. The physical constraints are, for example, those for angles and angular velocities set in such a way that the first and second links which correspond to physical members do not collide with each other. The environmental constraints are, for example, those for angles and angular velocities set in such a way that the first and second links which correspond to physical members do not collide with an external obstacle. If the next state meets the physical constraints and environmental constraints, the process goes to step S050. If the next state does not meet any of the physical constraints and environmental constraints, the process goes to step S060.

In step S050 of FIG. 3, the known-state registration tree generating section 103 registers the next state represented by a branch derived by the search tree generating section 101 as a branch of the known-state registration tree.

When the known-state registration tree generating section 103 registers a branch of the known-state registration tree, it may obtain a distance between the state represented by the branch and the goal state and may compare the distance with the minimum distance among distances between states represented by the branches of the known-state registration tree which already exist and the goal state. If the distance is smaller than the minimum distance, the known-state registration tree generating section 103 regards the state which corresponds to the distance as a final best state and may store the state and the distance in the known-state registration tree storing section 105.

In step S060 of FIG. 3, the known-state registration tree generating section 103 discards the next state derived by the search tree generating section 101.

Figure 6:
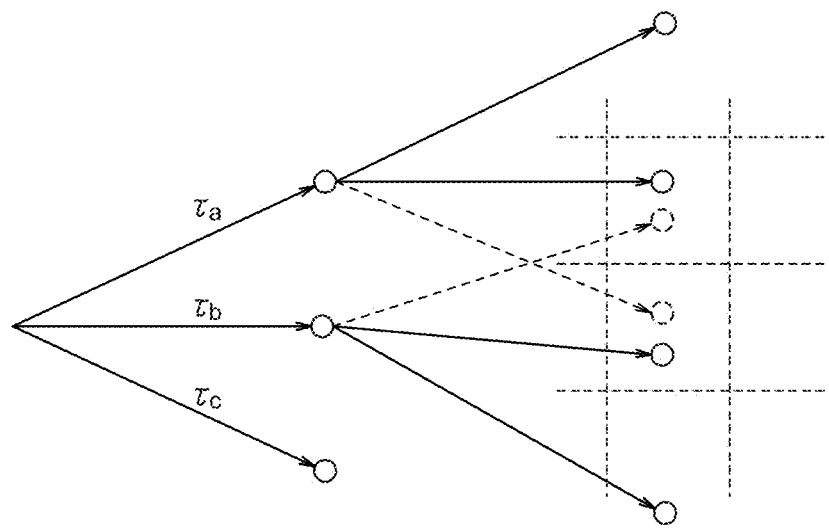
FIG. 6 illustrates operations of steps S050 and S060 of FIG. 3.

FIG. 6 illustrates operations of steps S050 and S060 of FIG. 3. As to branches of the known-state registration tree, only one tree should exist in one cell in principle. When the search tree generating section 101 generates a new branch (which is represented as a circle with a dotted line in FIG. 6) in a cell in which a branch of the known-state registration tree (which is represented as a circle with a solid line in FIG. 6) already exists, the new branch will be discarded. That is, states which are close to one another in the phase space are put together into a single state. Thus, calculation cost can be remarkably reduced by putting together branches of the conventional search tree into a branch of the known-state registration tree.

When a branch derived by the search tree generating section 101 belongs to a cell to which the goal state belongs, the known-state registration tree generating section 103 may register a new branch in the cell even if a branch of the known-state registration tree corresponding to a state which belongs to the cell has already been registered. By such an approach, a final state which is closer to the goal state can be obtained.

In step S070 of FIG. 3, the search tree generating section 101 determines whether or not the search has been completed. The search tree generating section 101 may determine that the search has been completed when search up to a predetermined depth of the search tree has been completed or search for a lapse of a predetermined time period has been completed. When the search is determined to be completed, the process goes to step S080. When the search is not determined to be completed, the process returns to step S030 and the search is continued.

In step S080 of FIG. 3, the trajectory generating section 107 selects the state which is closest to the goal state in distance in the phase state from the states represented by the branches of the known-state registration tree and regards the state as the best state (in the case of optimizing the final state). When the known-state registration tree generating section 103 seeks the final best state, the final best state is regarded as the best state. Alternatively, the trajectory generating section 107 selects the state whose distance in the phase space to the target state is equal to or less than a predetermined value and whose depth in the search tree is the smallest and regards the state as the best state (in the case of optimizing access time). The trajectory generating section 107 obtains a trajectory from the current state (initial state) to the best state by obtaining paths of branches of the known-state registration tree from the current state to the best state. Thus, a trajectory planning is obtained. For example, a robot can optimize the final state of its arm or can optimize access time to the goal state by controlling its arm according to the trajectory planning thus obtained.

When a trajectory planning method according to the present invention is described in the text of specification, the object is represented as double inverted pendulums 200. However, the idea of use of a known-state registration tree can be applied to a trajectory planning method in a state space of any object.

Experiments using simulation concerning control of the double inverted pendulums 200 shown in FIG. 2 will be described below. A length and a mass of the first link 205 of the double inverted pendulums 200 are $l_1$ and $m_1$, respectively. The center of gravity 203 is positioned at the center of the link. A length and a mass of the second link 211 of the double inverted pendulums 200 are $l_2$ and $m_2$, respectively. The center of gravity 209 is positioned at the center of the link. Further, acceleration of gravity is represented as g. The equations of motion of the double inverted pendulums 200 are represented as below.

$$(\alpha + \gamma + 2\beta\cos\theta_2)\ddot{\theta}_1 + (\gamma + \beta\cos\theta_2)\ddot{\theta}_2 - $$
$$\beta(2\dot{\theta}_1 + \dot{\theta}_2)\dot{\theta}_2\sin\theta_2 + k_1\cos\theta_1 + k_2\cos(\theta_1 + \theta_2) = \tau_1$$

$$(\gamma + \beta\cos\theta_2)\ddot{\theta}_1 + \gamma\ddot{\theta}_2 + \beta\dot{\theta}_1^2\sin\theta_2 + k_2\cos(\theta_1 + \theta_2) = \tau_2$$

$$\alpha = I_1 + \frac{1}{4}m_1 l_1^2 + m_2 l_1^2$$

$$\beta = \frac{1}{2}l_1 m_2 l_2$$

$$\gamma = I_2 + \frac{1}{4}m_2 l_2^2$$

$$k_1 = \left(\frac{1}{2}m_1 l_1 + m_2 l_1\right)g$$

$$k_2 = \frac{1}{2}m_2 l_2 g$$

The coordinates are changed as shown below in order to facilitate the understanding of a relationship between joint angle and gravity.

$$q_1 = \theta_1 - \frac{\pi}{2}$$

$$q_2 = \theta_2$$

Figure 7:
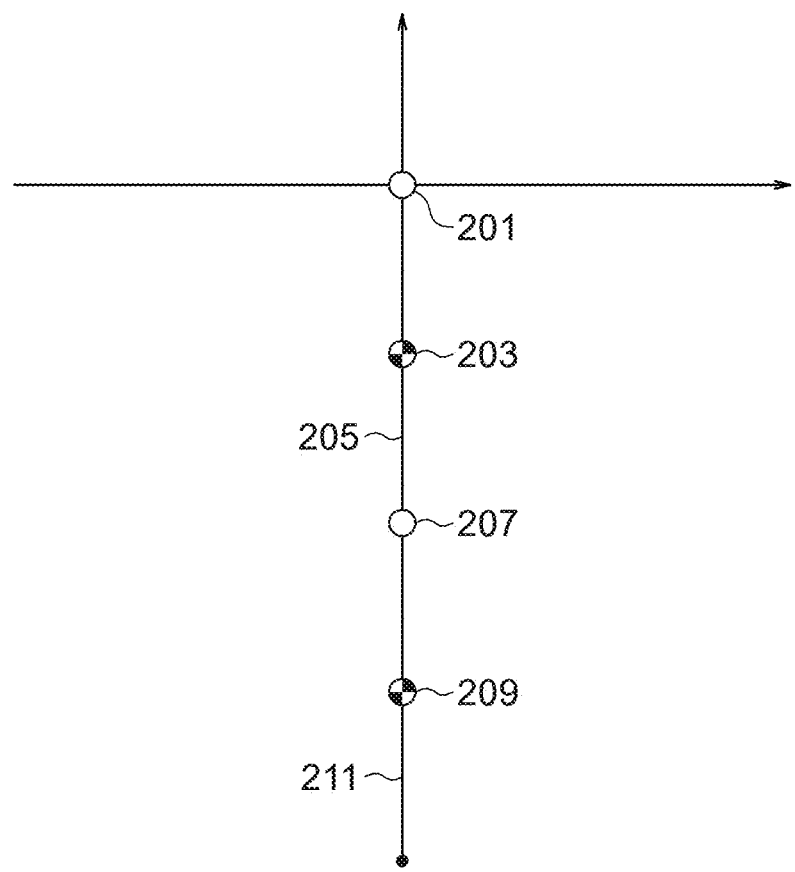
FIG. 7 shows the initial state of the double inverted pendulums.

FIG. 7 shows the initial state of the double inverted pendulums 200. The coordinates of the double inverted pendulums 200 in the initial state are shown below.

$(q_1, \dot{q}_1) = (-\pi, 0)$ $(q_2, \dot{q}_2) = (0, 0)$

Figure 8:
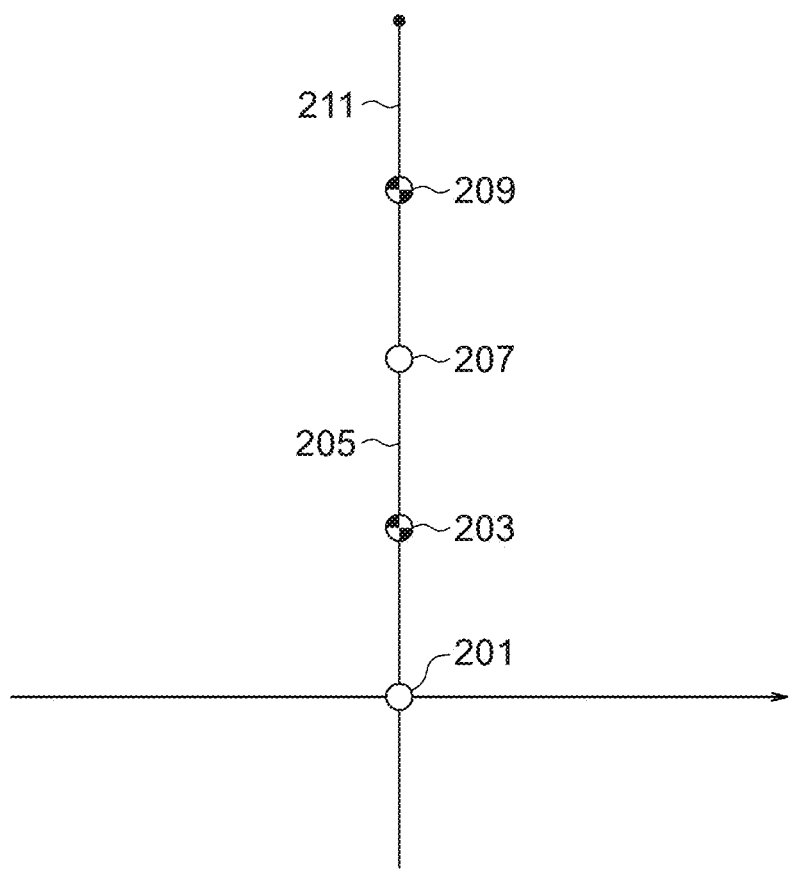
FIG. 8 shows the goal state of the double inverted pendulums.

FIG. 8 shows the goal state of the double inverted pendulums 200. The coordinates of the double inverted pendulums 200 in the goal state are shown below.

$(q_1, \dot{q}_1) = (0, 0)$ $(q_2, \dot{q}_2) = (0, 0)$

In the experiment, the process of the trajectory planning method shown in FIG. 3 and simulation of motion of the double inverted pendulums 200 are carried out.

Experiment 1

Table 1 shows settings of the simulation of Experiment 1. A time interval to the next state described above corresponds to torque switching time step.

TABLE 1

| Time step | Torque switching time step | Optimization |
|---|---|---|
| 5 [ms] | Switching at intervals of 100 [ms] | Optimization of final state |

Table 2 shows parameters of the first joint and the second joint. In Table 2, the maximum torque of the first joint is represented as 2 [Nm] and torque resolution in generating search tree is represented as 10 segments. This means that a range of torque from −2 [Nm] to 2 [Nm] is divided into 10 segments and, for example, torques of −1.8 [Nm], −1.4 [Nm], −1.0 [Nm] . . . 1.0 [Nm], 1.4 [Nm] and 1.8 [Nm] are imposed and then the next state (angle and angular velocity) is obtained using the equations of motion for each case. In Experiment 1, ten different torques are imposed on the first joint and the second joint, respectively and therefore hundred different next states are derived.

TABLE 2

| | Length of link | Mass | Maximum torque | Torque resolution in generating search tree | Number of segments of states in phase space |
|---|---|---|---|---|---|
| 1st joint | 0.5 [m] | 0.5 [kg] | 2 [Nm] | 10 segments | 12 segments (direction of angle) 12 segments (direction of angular vel.) |
| 2nd joint | 0.5 [m] | 0.5 [kg] | 1 [Nm] | 10 segments | 12 segments (direction of angle) 20 segments (direction of angular vel.) |

Figure 9:
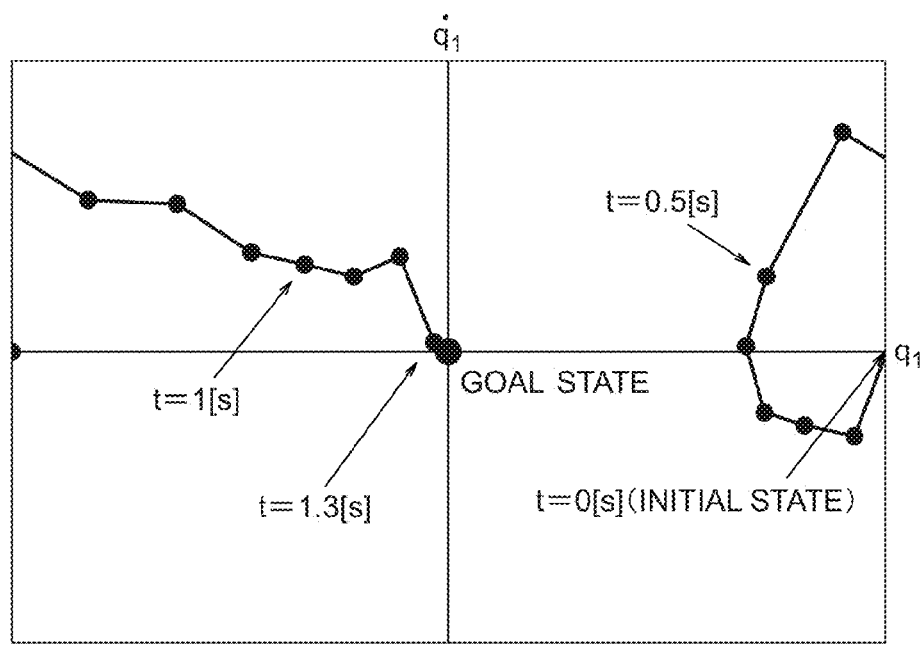
FIG. 9 shows a trajectory in the first joint phase space obtained in Experiment 1.

FIG. 9 shows a trajectory in the first joint phase space obtained in Experiment 1. The first joint reached the goal state after a lapse of 1.3 seconds. In FIG. 9, the coordinate of angle q at the initial state is π which is equal to −π.

Figure 10:
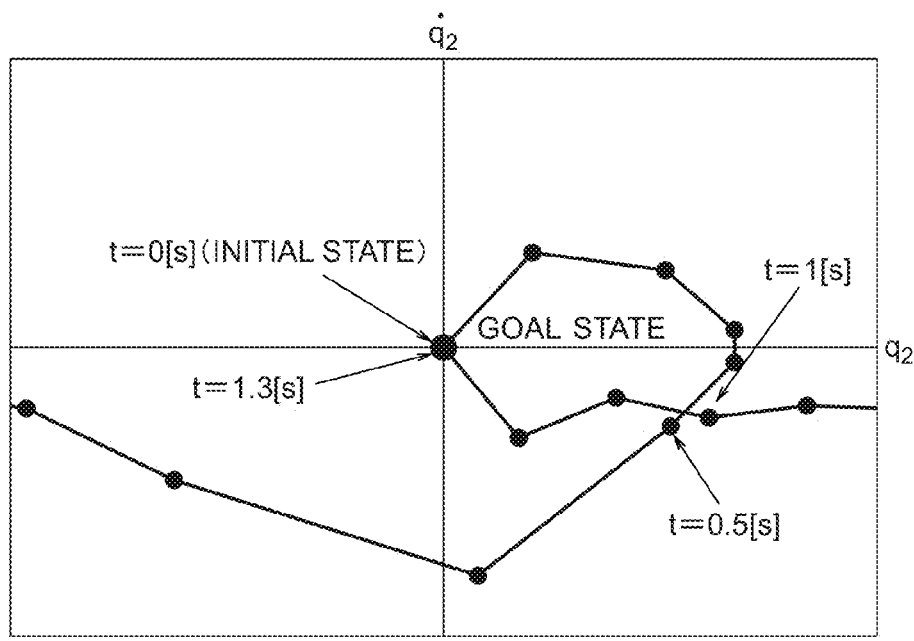
FIG. 10 shows a trajectory in the second joint phase space obtained in Experiment 1.

FIG. 10 shows a trajectory in the second joint phase space obtained in Experiment 1. The second joint reached the goal state after a lapse of 1.3 seconds.

Figure 11:
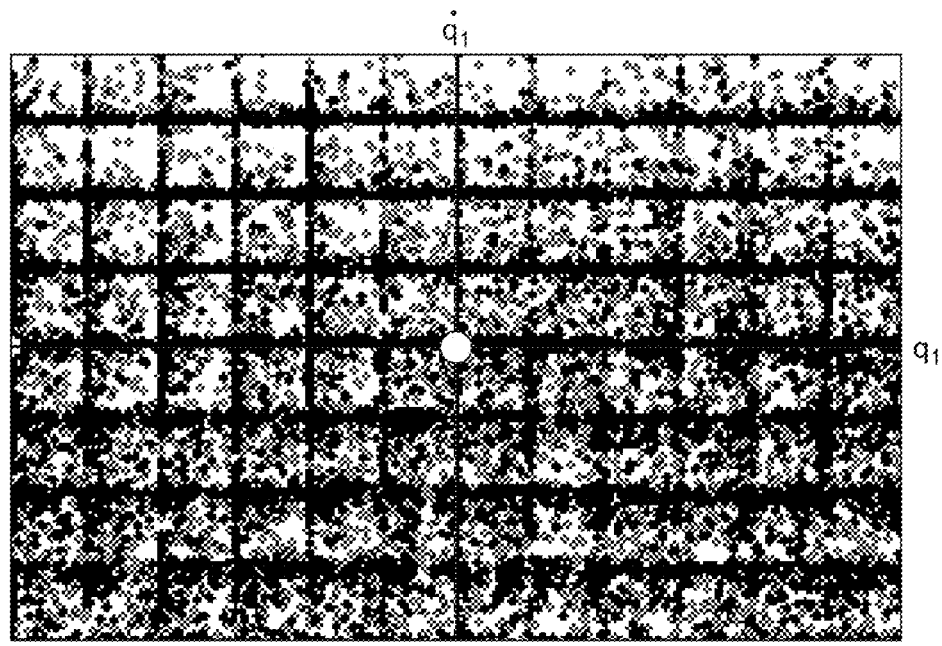
FIG. 11 shows positions in the first joint phase space of all states of the first joint obtained as branches of the search tree in Experiment 1.

FIG. 11 shows positions in the first joint phase space of all states of the first joint obtained as branches of the search tree in Experiment 1.

Figure 12:
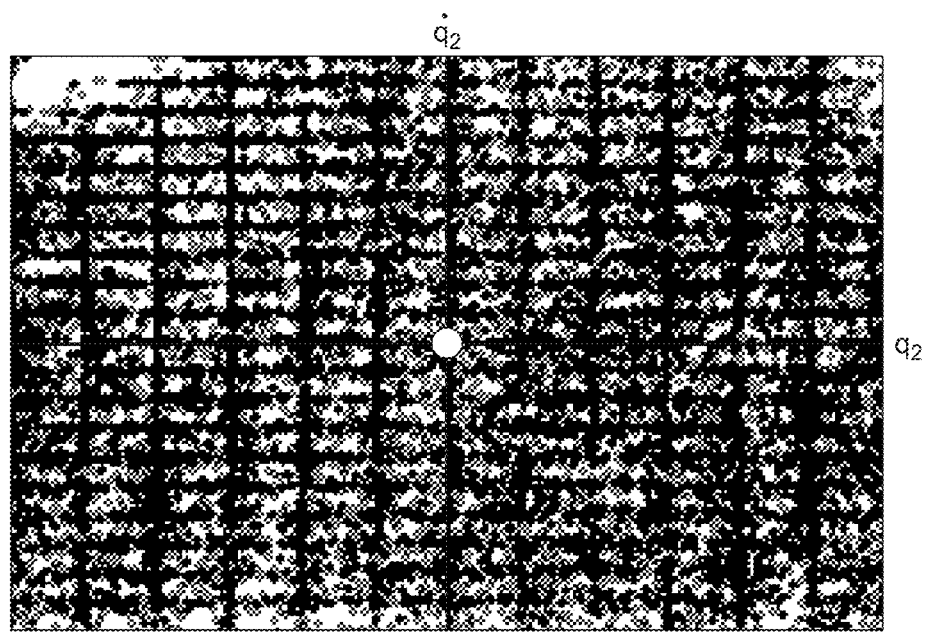
FIG. 12 shows positions in the second joint phase space of all states of the second joint obtained as branches of the search tree in Experiment 1.

FIG. 12 shows positions in the second joint phase space of all states of the second joint obtained as branches of the search tree in Experiment 1.

According to FIGS. 11 and 12, the whole phase space has been substantially searched. This means that a trajectory planning can be obtained even if any state in the phase space is designated as a goal state.

The torque resolution and the number of segments in the phase space are adjusted and then determined in such a way that positions of states are uniformly distributed in sufficiently wide ranges in the first phase space and the second phase space.

Experiment 2

Table 3 shows settings of the simulation of Experiment 2. A time interval to the next state described above corresponds to torque switching time step.

TABLE 3

| Time step | Torque switching time step | Optimization |
|---|---|---|
| 5 [ms] | Switching at intervals of 100 [ms] | Optimization of final state |

Table 4 shows parameters of the first joint and the second joint. In Table 2, maximum torque is reduced with respect to that of Experiment 1. No torque is imposed on the second joint. In Table 4, as to the first joint, the maximum torque is represented as 1.5 [Nm] and torque resolution in generating search tree is represented as 10 segments. This means that a range of torque from −1.5 [Nm] to 1.5 [Nm] is divided into 10 segments and, for example, torques of −1.35 [Nm], −1.05 [Nm], −0.75 [Nm] . . . 0.75 [Nm], 1.05 [Nm] and 1.35 [Nm] are imposed and then the next state (angle and angular velocity) is obtained using the equations of motion for each case. In Experiment 2, ten different torques are imposed on the first joint and no torque is imposed on the second joint and therefore ten different next states are derived.

TABLE 4

| | Length of link | Mass | Maximum torque | Torque resolution in generating search tree | Number of segments of states in phase space |
|---|---|---|---|---|---|
| 1st joint | 0.5 [m] | 0.5 [kg] | 1.5 [Nm] (<2) | 10 segments | 12 segments (direction of angle) 12 segments (direction of angular vel.) |
| 2nd joint | 0.5 [m] | 0.5 [kg] | 0 [Nm] (<1) | 1 segment | 12 segments (direction of angle) 20 segments (direction of angular vel.) |

Figure 13:
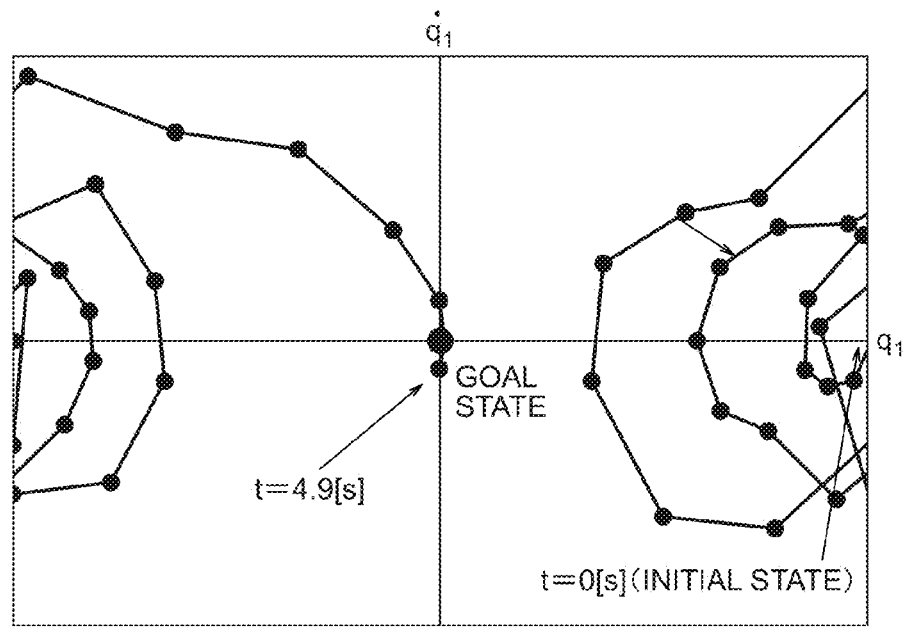
FIG. 13 shows a trajectory in the first joint phase space obtained in Experiment 2.

FIG. 13 shows a trajectory in the first joint phase space obtained in Experiment 2. The first joint reached the goal state after a lapse of 4.9 seconds. In FIG. 13, the coordinate of angle q at the initial state is $\pi$ which is equal to $-\pi$.

Figure 14:
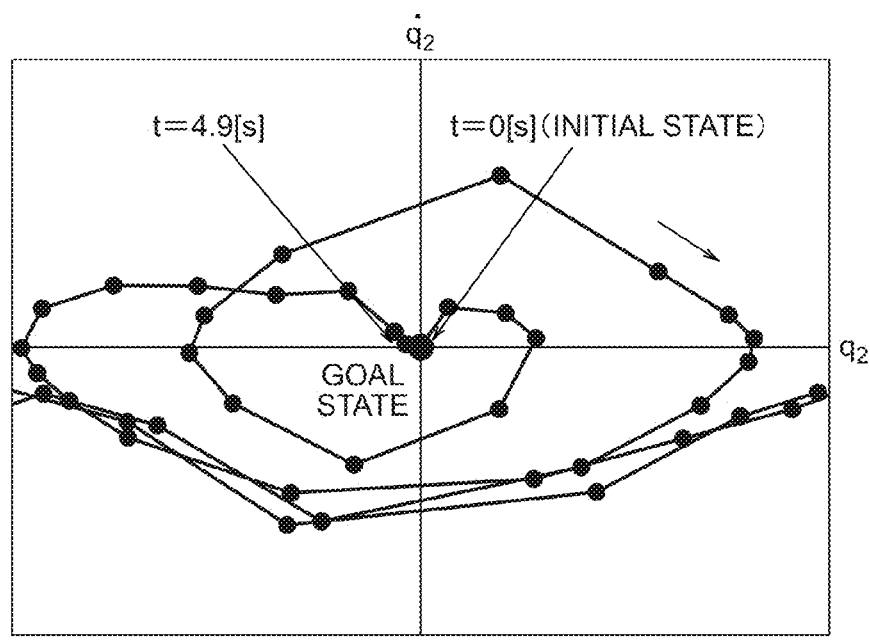
FIG. 14 shows a trajectory in the second joint phase space obtained in Experiment 2.

FIG. 14 shows a trajectory in the second joint phase space obtained in Experiment 2. The second joint reached the goal state after a lapse of 4.9 seconds.

Figure 15:
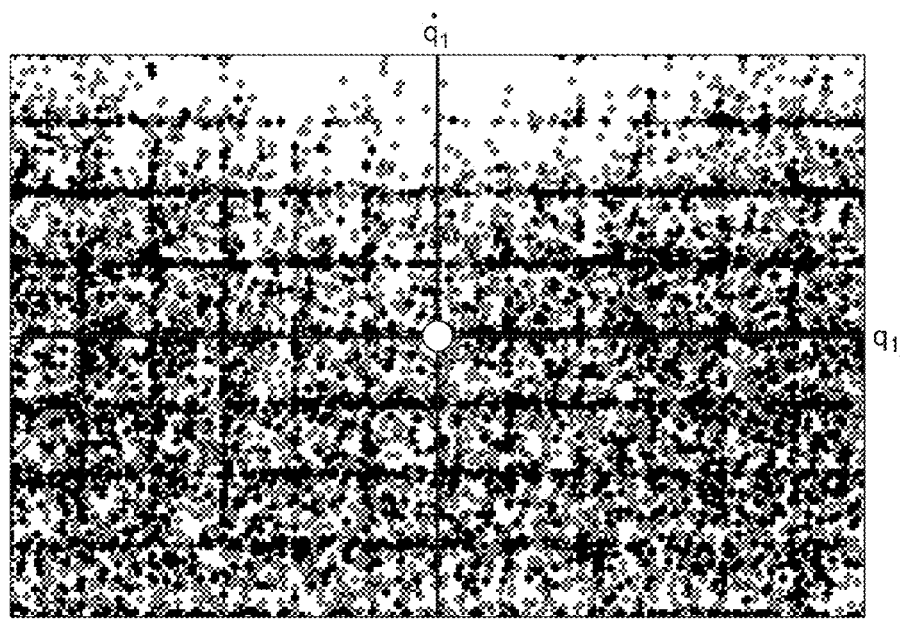
FIG. 15 shows positions in the first joint phase space of all states of the first joint obtained as branches of the search tree in Experiment 2.

FIG. 15 shows positions in the first joint phase space of all states of the first joint obtained as branches of the search tree in Experiment 2.

Figure 16:
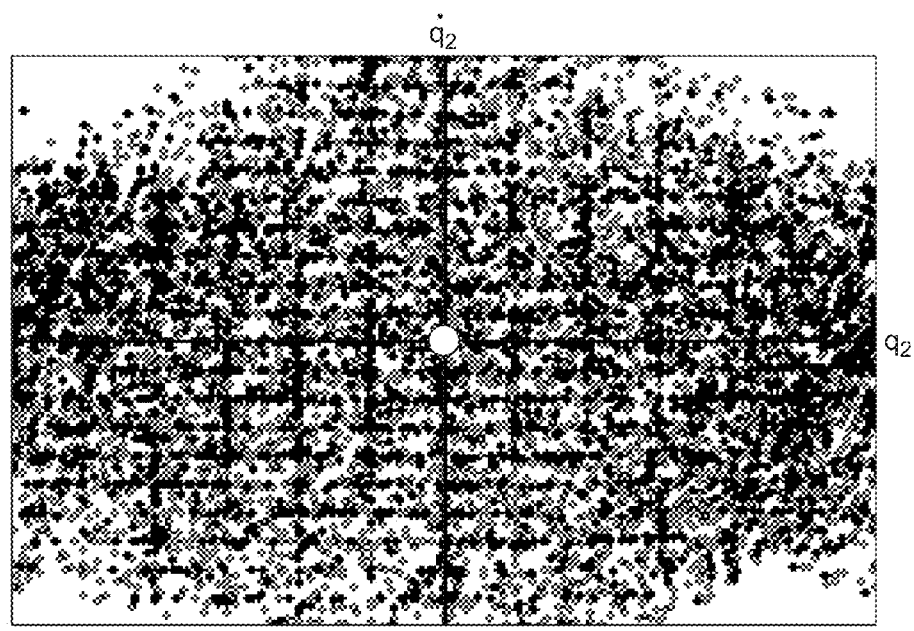
FIG. 16 shows positions in the second joint phase space of all states of the second joint obtained as branches of the search tree in Experiment 2.

FIG. 16 shows positions in the second joint phase space of all states of the second joint obtained as branches of the search tree in Experiment 2.

When FIG. 15 is compared with FIG. 11 and FIG. 16 is compared with FIG. 12, a region which has not been searched is broadened. The reason is that a setting of maximum torque is reduced and therefore a region which can be reached with the maximum torque is reduced. For the region which can be reached with the maximum torque, uniform torque is carried out.

Experiment 3

Experiment 3 was carried out under the same conditions as those of Experiment 2 except that a trajectory is determined in such a way that angle does not fall within a range between $-90$ degrees ($-\pi/2$) and 0 degree. A region in the phase space is limited by the procedure shown in step S045 of FIG. 3.

Figure 17:
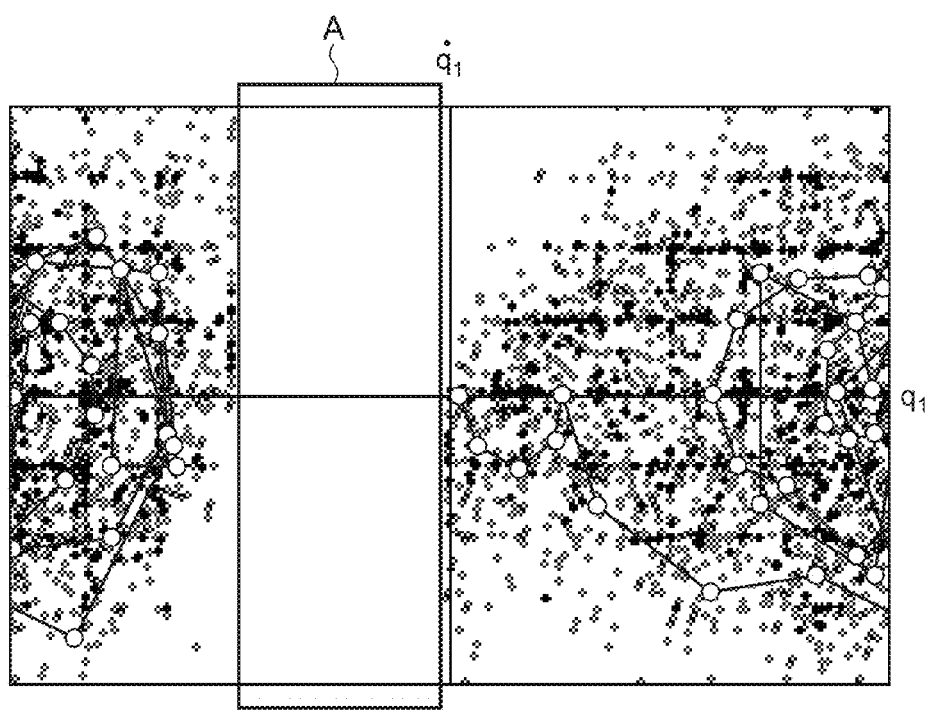
FIG. 17 shows a trajectory in the first joint phase space obtained in Experiment 3 and positions of all states of the first joint obtained as branches of the search tree in Experiment 3.

FIG. 17 shows a trajectory in the first joint phase space obtained in Experiment 3 and positions of all states of the first joint obtained as branches of the search tree in Experiment 3. In FIG. 17, a state in a region in the first phase space in which angle is between $-90$ degrees ($-\pi/2$) and 0 degree (a region marked with A in FIG. 17) has not been selected.

Figure 18:
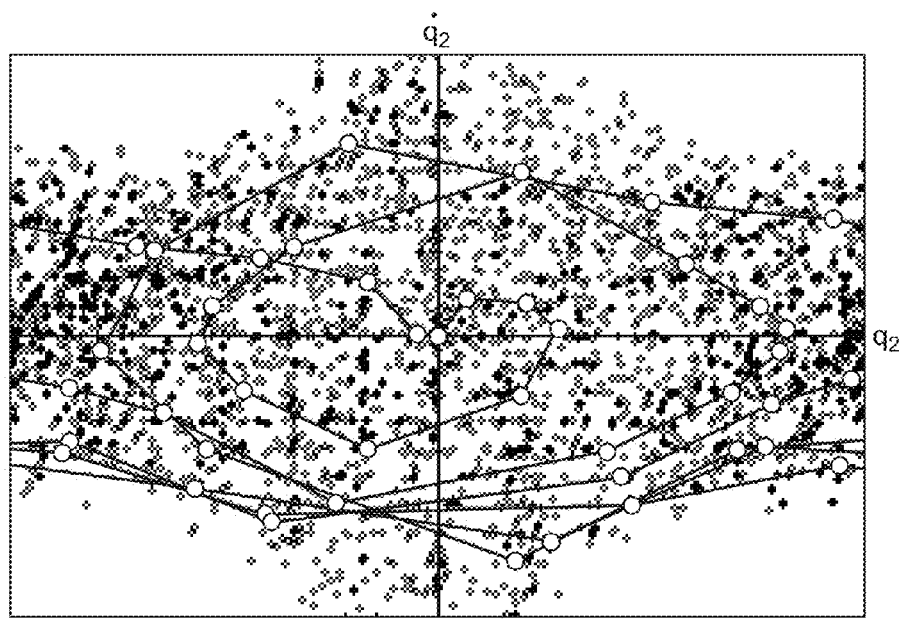
FIG. 18 shows a trajectory in the second joint phase space obtained in Experiment 3 and positions of all states of the second joint obtained as branches of the search tree in Experiment 3.

FIG. 18 shows a trajectory in the second joint phase space obtained in Experiment 3 and positions of all states of the second joint obtained as branches of the search tree in Experiment 3.

When FIG. 17 is compared with FIG. 13 and FIG. 18 is compared with FIG. 14, the target was finally reached with a different trajectory as shown in FIG. 17 and FIG. 18.

Evaluation of Calculation Cost

Table 5 shows the number of states to be searched and calculation time for Experiment 1, Experiment 2 and the case in which search is carried out under the same conditions as those of Experiment 1 but not using a known-state registration tree. In the case in which search is carried out without using a known-state registration tree, assuming that the number of branches derived from the root or a branch is represented as N and a depth of the tree at the deepest level is M, the number of branches (states) to be searched at the deepest level is represented as NM as described above. According to the conditions of Experiment 1, the following equations are held.

$$N = 10 \times 10 = 100$$

$$M = 5[s]/0.1[s] = 50$$

Adding the number of branches at levels other than the deepest level, the number of states to be searched is represented as below.

$$\sum_{n=1}^{50} 100^n$$

Calculation time is measured using one core alone of Intel Core2 Duo T7500.

According to Table 5, the number of states to be searched becomes enormous when a known-state registration tree is not used, and therefore a complete full search cannot be carried out. According to Experiment 1 of the present embodiment, a complete fill search which could not be carried out by conventional methods can be carried out. Thus, according to the present invention, search in a phase space has no constraints.

Further, a known-state registration tree according to the present invention can be applied not only to a case in which a complete full search is carried out but also to a case in which a selective search on a search tree is carried out using an evaluation function or the like.

TABLE 5

|  | Experiment 1 | Experiment 2 | Theoretical values under same conditions as those of Exp. 1 and without using known-state registration tree |
|---|---|---|---|
| Number of states to be searched | 27307 × 100 | 12386 × 10 | $\sum_{n=1}^{50} 100^n$ |
| Number of states registered in known-state registration tree | 27307 | 12386 |  |
| Calculation time | 62 [s] | 10 [s] | . . . |

Trajectory Control

Control of a generated trajectory will be described below.

Figure 19:
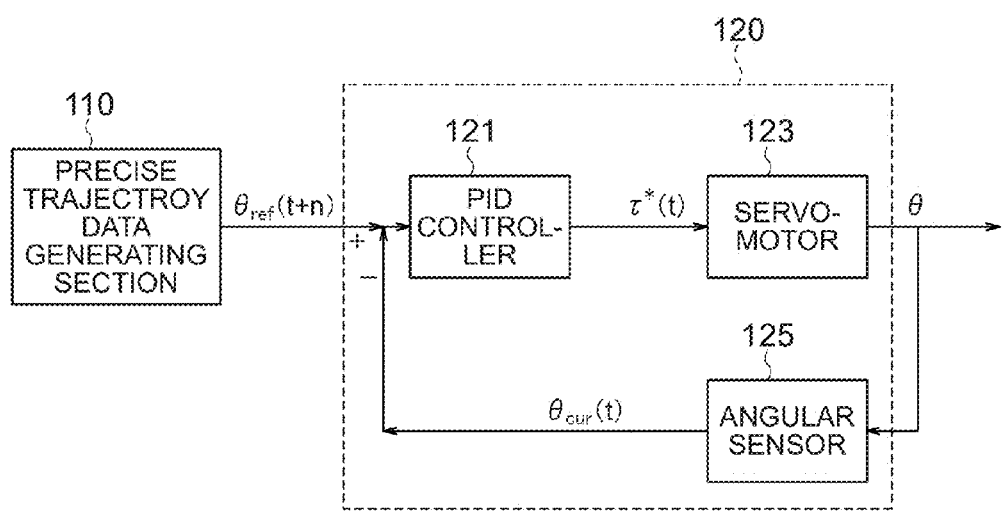
FIG. 19 shows a configuration of the precise trajectory data generating section and the trajectory controlling section of the trajectory planning and controlling system shown in FIG. 1.

FIG. 19 shows a configuration of the precise trajectory data generating section 110 and the trajectory controlling section 120 of the trajectory planning and controlling system 100 shown in FIG. 1.

The precise trajectory data generating section 110 generates precise trajectory data (angles $\theta_{ref}$, angular velocities $\dot{\theta}_{ref}$ and torques $\tau_{ref}$ determined at intervals of 5 milliseconds) from trajectory data (angles, angular velocities and torques determined at intervals of 100 milliseconds) generated by the trajectory generating section 107.

The trajectory controlling section 120 includes a PID controller 121, a servomotor 123 and an angular sensor 125. The PID controller 121 of the trajectory controlling section 120 controls the servomotor at intervals of 5 milliseconds so as to realize angles of the precise trajectory data. Thus, a real-time trajectory control can be realized.

Figure 20:
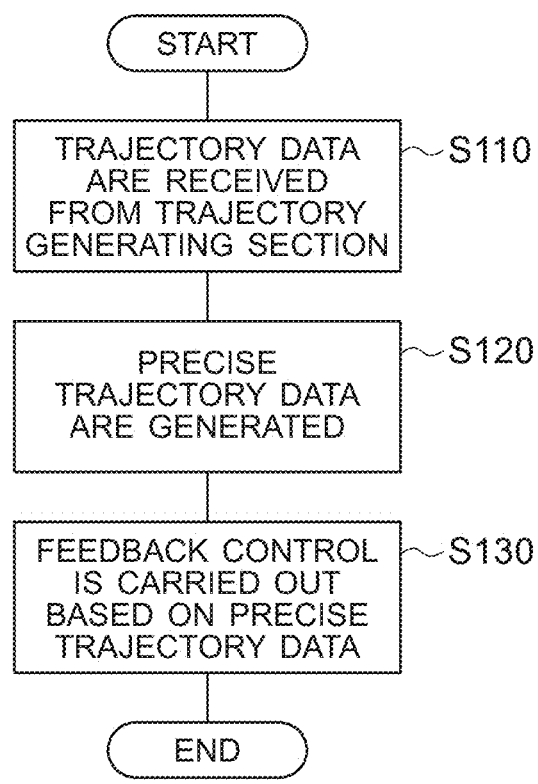
FIG. 20 is a flowchart for illustrating operation of the trajectory control.

FIG. 20 is a flowchart for illustrating operation of the trajectory control.

In step S110 of FIG. 20, the precise trajectory data generating section 110 receives trajectory data from the trajectory generating section 107. The received trajectory data includes angles, angular velocities and torques determined at intervals of 100 milliseconds.

In step S120 of FIG. 20, the precise trajectory data generating section 110 generates precise trajectory data which are angles $\theta_{ref}$, angular velocities $\dot{\theta}_{ref}$ and torques $\tau_{ref}$ determined at intervals of 5 milliseconds from the trajectory data which are angles, angular velocities and torques determined at intervals of 100 milliseconds, using the equations of motion.

In step S130 of FIG. 20, the PID controller 121 of the trajectory controlling section 120 carries out feedback control based on the precise trajectory data. More specifically, the PID controller 121 of the trajectory controlling section 120 sets a value of angle after n time intervals $\theta_{ref}(t+n)$ obtained from the precise trajectory data as a target value and a measured value of angle at present $\theta_{cur}(t)$ as an output value and obtains a target value of torque $\tau^*(t)$ as a manipulated variable using a difference between the target value and the output value by PID control. N represents an integer and n time interval means 5n milliseconds. When a feedback gain is sufficiently large, n=1 is most appropriate. When a feedback gain is insufficient, n should be selected from integers which are greater than 1. When there exists no noise, a target value (a manipulated variable) τ*(t) which is delivered to the servomotor 123 by the PID controller 121 agrees with a predicted value of torque $\tau_{ref}$ included in the precise trajectory data. Predicted values of torque $\tau_{ref}$ are calculated in consideration of the torque limits as described concerning Experiment 2. Accordingly, target values of torque given by the PID controller will fall within a range determined in consideration of the torque limits.

Figure 21:
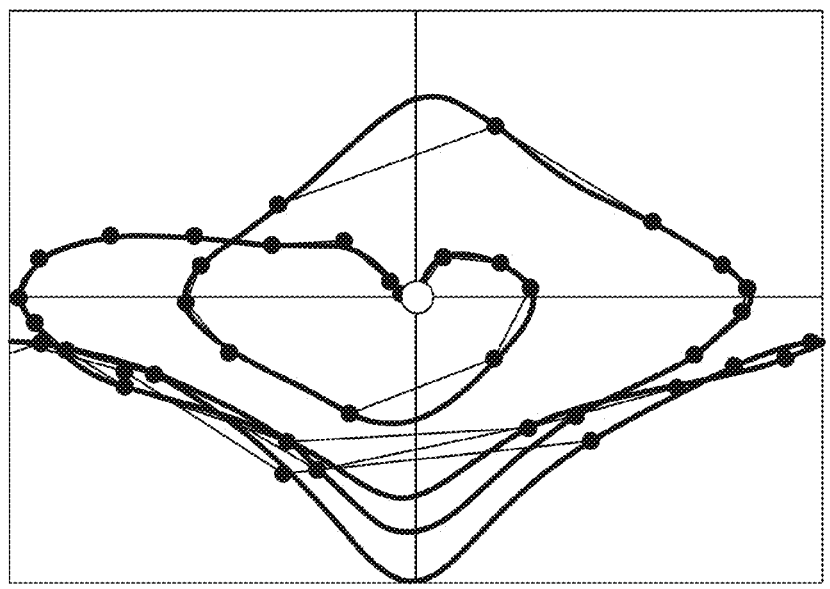
FIG. 21 shows trajectory data at intervals of 100 milliseconds (a slender line) generated by the trajectory generating section and trajectory data at intervals of 5 milliseconds (a thick line) generated by the precise data generating section.

FIG. 21 shows trajectory data at intervals of 100 milliseconds (a slender line) generated by the trajectory generating section 107 and trajectory data at intervals of 5 milliseconds (a thick line) generated by the precise data generating section 110. The trajectory data at intervals of 100 milliseconds are identical with those shown in FIG. 14.

Figure 22:
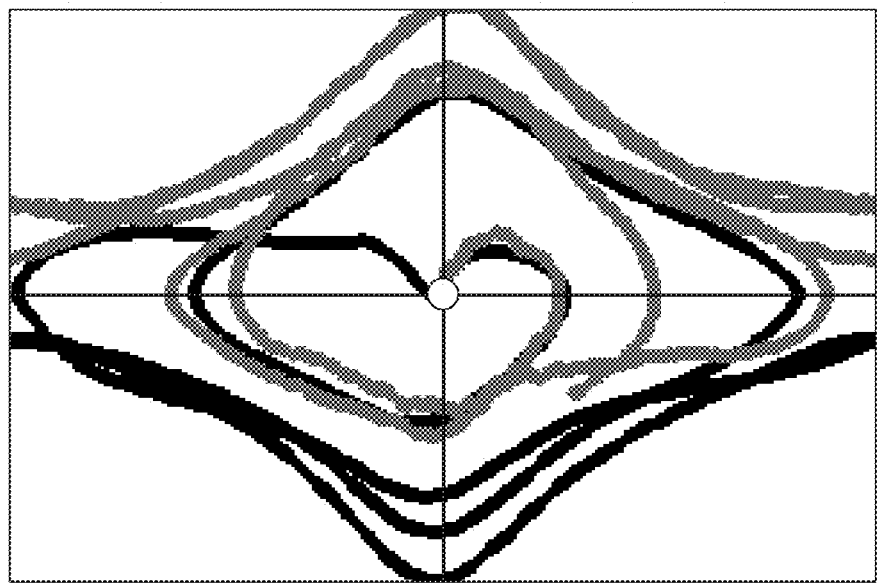
FIG. 22 shows trajectory data at intervals of 5 milliseconds (a dark-colored line) generated by the precise data generating section and trajectory data (a light-colored line) generated with torques to which noise of 5% has been added.

FIG. 22 shows trajectory data at intervals of 5 milliseconds (a dark-colored line) generated by the precise data generating section 110 and trajectory data generated with torques to which noise of 5% has been added (a light-colored line). FIG. 22 clearly demonstrates that the trajectory has been changed by the noise.

Figure 23:
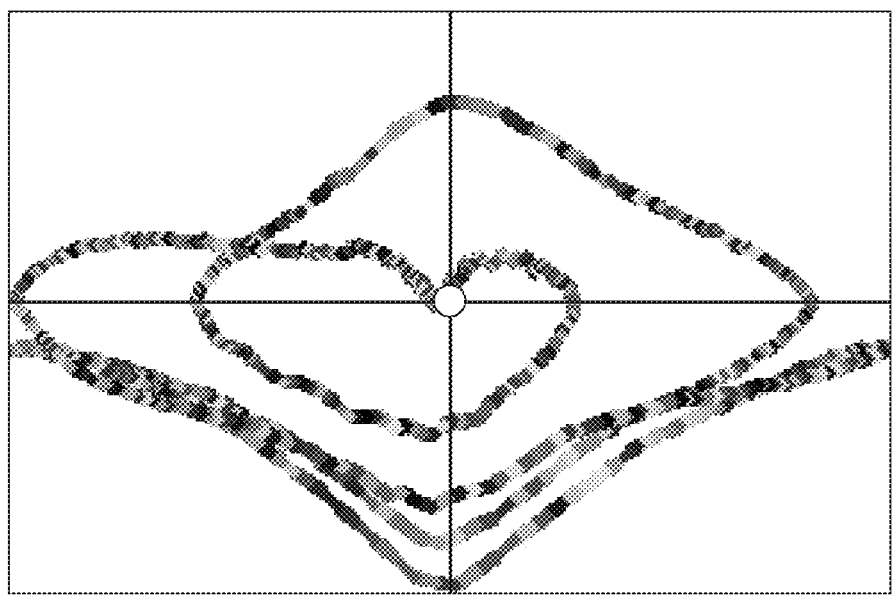
FIG. 23 shows trajectory data generated with torques to which noise of FIG. 22 has been added and also under the control of the PID controller.

FIG. 23 shows trajectory data generated with torques to which noise of FIG. 22 has been added and also under the control of the PID controller 121. The trajectory data shown in FIG. 23 are identical with those generated without noise in FIG. 22. That is, the noise has been cancelled by the feedback control and the trajectory generated by the precise trajectory data generating section 110 has been realized. In FIG. 23, darkness of color of the trajectory represents magnitude of the manipulated variable of the PID controller 121.

Application to Robots

A robot means a mechanical apparatus which has one or more members connected with one or more joints and which is capable of controlling positions of the members.

Figure 24:
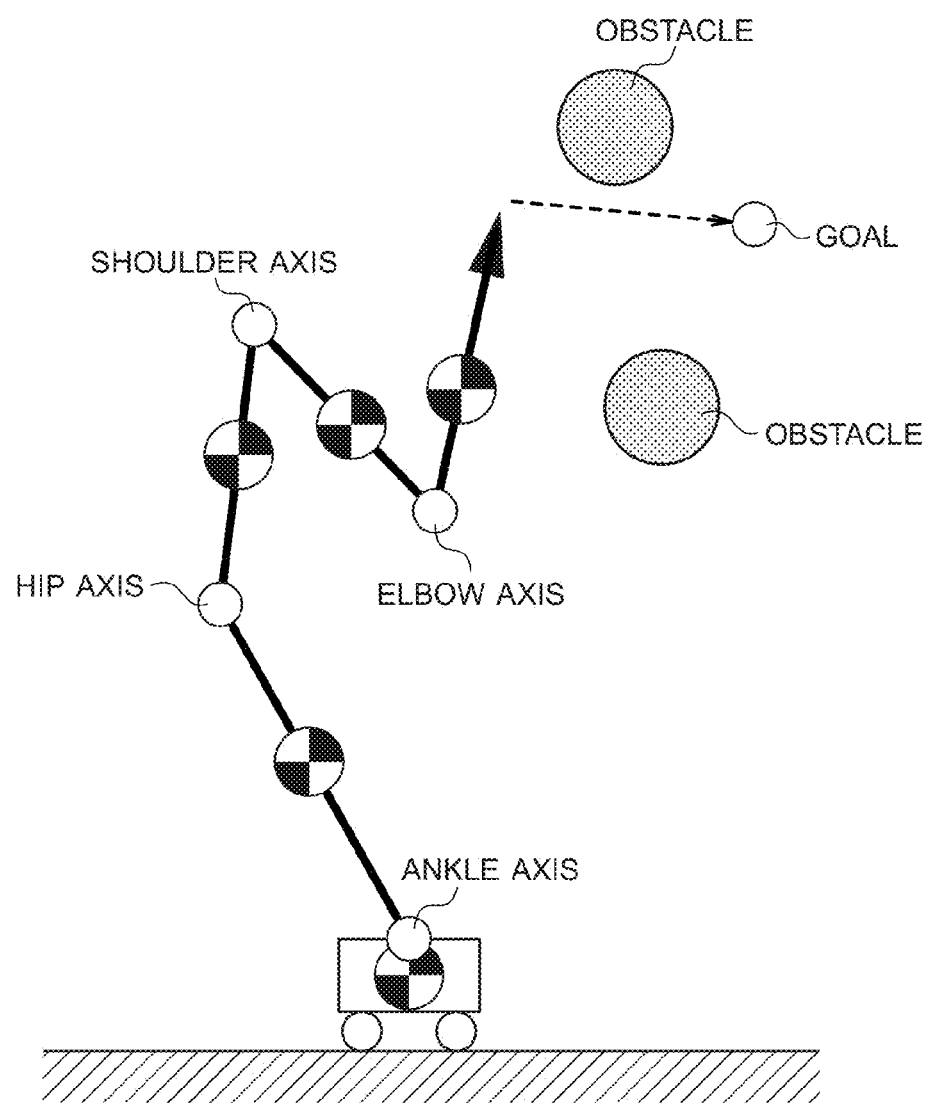
FIG. 24 shows a robot which includes a plurality of members connected by a plurality of joints including elbow axes, a shoulder axis, a hip axis and ankle axes.

FIG. 24 shows a robot which includes a plurality of members connected by a plurality of joints including elbow axes, a shoulder axis, a hip axis and ankle axes. There exist obstacles in the vicinity of the robot and a member corresponding to an arm of the robot is controlled in such a way that it reaches the goal moving around the obstacles.

In such a robot as shown in FIG. 24, it is considered that the members corresponding to the upper body and those corresponding to the lower body are made to operate in harmony toward a target of the hand or a target of the whole-body posture. In this case, transition from the current state to the next state in the phase space should be predicted using equations of motion concerning the whole-body (all members) of the robot.

In such a robot as shown in FIG. 24, it is considered that a number of joints are controlled simultaneously. In this case, joint angles and joint angular velocities of all the joints should be mapped onto a high dimensional phase space which has a dimension of twice of the number of the joints to describe machine states.

In such a robot as shown in FIG. 24, it is considered that a motion is planned in such a way that physical constraints (constraints concerning the robot itself) are satisfied. When constraints of torque are provided as physical constraints, limits of torque used to predict the next state are provided as described concerning Experiment 2. When limits of position or velocity are set as physical constraints, next sates which do not meet the constraints are discarded as described concerning step S045 of FIG. 3. The results of this case were described concerning Experiment 3.

In such a robot as shown in FIG. 24, it is considered that a motion is planned in such a way that the robot moves around an obstacle. Next stages in which the robot would collide with the obstacle are discarded as described concerning step S045 of FIG. 3.

In such a robot as shown in FIG. 24, it is considered that the robot is made to move along a generated trajectory in real time. In this case, precise trajectory data are generated by the precise trajectory data generating section 110 and the servomotor 123 is manipulated under feedback control based on the precise trajectory data using PID control by the PID controller 121 shown in FIG. 19 or the like in such a way that the members can move along the generated precise trajectory.

As described above, the trajectory planning method and trajectory planning system according to the present invention can be effectively used in a robot including a plurality members connected by a plurality of joints in the case that the members corresponding to the upper body and those corresponding to the lower body are made to operate in harmony toward a target of the hand or a target of the whole-body posture, in the case that a number of joints are controlled simultaneously, in the case that a motion is planned in such a way that physical constraints are satisfied, in the case that a motion is planned in such a way that the robot moves around an obstacle, and in the case that the robot is made to move along a generated trajectory in real time.

What is claimed is:

1. A trajectory planning method for determining a trajectory for controlling a state of a target device from an initial state toward a goal state, the method performed by a computer in a trajectory planning system, the computer comprising hardware, the computer configured to perform the method comprising steps of:

a. dividing a state space for representing states of the target device into cells;
   b. determining the initial state of the target device as a root of a search tree in the state space;
   c. extending the search tree starting from the root, by determining, as a new branch of the search tree, an edge connecting one node indicative of one state of the target device with another node indicative of a next state which the target device reaches after a predetermined time period as a result of that one of possible inputs is applied to the target device within the predetermined time period;
   d. finding out a cell containing the next state, and determining whether the cell containing the next state contains any other state which is already stored as a branch of the search tree;
   e. discarding the
   new branch determined at step c if the cell containing the next state contains any other state already stored as a branch of the search tree, and, if the cell containing the next state does not contain any other state already stored as a branch of the search tree, storing the new branch determined at step c;
   f. executing step c through step e repeatedly until a predefined search termination condition is met;
   g. selecting, after the predefined search termination condition is met, one state as a best state from the states each indicated by the respective stored node and having a distance in the state space to the goal state less than a predetermined value, and determining one set of the stored branches of the search tree connecting the initial state with the best state; and h. determining a trajectory of the target device from the initial state towards the goal state using a sequence of states indicated by the determined one set of the stored branches of the search tree.

2. A trajectory planning method according to claim 1, wherein a search range of the trajectory from the initial state towards the goal state is restricted by determining an area of the state space to which a state of the target device is allowed to belong.

3. A trajectory planning method according to claim 1, wherein, in step c, at least one node is selected from the stored node, and wherein the search tree is extended from the selected at least one node.

4. A trajectory planning method according to claim 1, wherein, in step e, if the cell containing the next state contains the goal state, the new branch determined at step c is stored without discarding said new branch even if the cell containing the next state contains any other state already stored as a branch of the search tree.

5. A trajectory planning method according to claim 1, wherein, in step e, at the time when storing the new branch, a distance between the next state and the goal state in the state space is calculated and is stored in association with the next state, and the next state is stored as a final best state if the distance calculated for said next state is less than the minimum value of the distance from among the nodes already been stored, and
wherein, in step g, the final best state is selected as the best state.

6. A trajectory planning method according to claim 1, wherein the target device includes one or more members each having at least one end connected with a joint.

7. A trajectory planning method according to claim 1, wherein the target device includes members of a robot.

8. A trajectory planning method according to claim 1, wherein the state space is a phase space, and the possible inputs are inputs for generating motions of the target device.

9. A trajectory planning method according to claim 1, wherein a search range of the trajectory from the initial state towards the goal state is restricted by providing constraints on the possible input to the target device within the predetermined time period.

10. A trajectory planning method according to claim 1, wherein, in step c, the search tree is extended from end nodes of all of the stored branches at current lowest level of the search tree by determining the new branches, each having, as the one node, the end node of each of the stored branches at the current lowest level of the search tree.

11. A trajectory planning system for determining a trajectory for controlling a state of a target device from an initial state toward a goal state, the system comprising
a computer, the computer comprising hardware and configured to:
p) divide a state space for representing states of the target device into cells;
q) determine the initial state of the target device as a root of a search tree in the state space;
r) extend the search tree starting from the root, by determining, as a new branch of the search tree, an edge connecting one node indicative of one state of the target device with another node indicative of a next state which the target device reaches after a predetermined time period as a result of that one of possible inputs is applied to the target device within the predetermined time period;
s) find out a cell containing the next state, and determine whether the cell containing the next state contains any other state which is already stored as a branch of the search tree;
t) discard the new branch determined at the operation r) if the cell containing the next state contains any other state already stored as a branch of the search tree, and, if the cell containing the next state does not contain any other state already stored as a branch of the search tree, store the new branch determined at the operation r);
u) execute the operation r) through the operation t) repeatedly until a predefined search termination condition is met;
v) select, after the predefined search termination condition is met, one state as a best state from the states each indicated by the respective stored node and having a distance in the state space to the goal state less than a predetermined value, and determine one set of the stored branches of the search tree connecting the initial state with the best state; and
w) determine a trajectory of the target device from the initial state towards the goal state using a sequence of states indicated by the determined one set of the stored branches of the search tree.

12. A trajectory planning system according to claim 11, wherein a search range of the trajectory from the initial state towards the goal state is restricted by determining an area of the state space to which a state of the target device is allowed to belong.

13. A trajectory planning system according to claim 11, wherein a search range of the trajectory from the initial state towards the goal state is restricted by providing constraints on the possible input to the target device within the predetermined time period.

14. A trajectory planning system according to claim 11, wherein the state space is a phase space, and the possible inputs are inputs for generating motions of the target device.

15. A trajectory planning and controlling system comprising the trajectory planning system according to claim 11 and a trajectory controller configured to control the target device to change its state along the trajectory determined by the trajectory planning system through feedback control.

16. A robot comprising a trajectory planning and controlling system according to claim 15 wherein the target device includes members of the robot, and the members of the robot are configured to be controlled according to the trajectory.

* * * * *